(12) United States Patent
Wong et al.

(10) Patent No.: US 10,674,418 B2
(45) Date of Patent: Jun. 2, 2020

(54) TERMINAL DEVICE, TELECOMMUNICATIONS NETWORKS AND METHODS

(71) Applicant: Sony Corporation, Tokyo (JP)

(72) Inventors: Shin Horng Wong, Basingstoke (GB); Brian Alexander Martin, Basingstoke (GB); Martin Warwick Beale, Basingstoke (GB); Yuxin Wei, Basingstoke (GB); Hideji Wakabayashi, Basingstoke (GB); Chrysovalantis Kosta, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/322,970

(22) PCT Filed: Jul. 5, 2017

(86) PCT No.: PCT/EP2017/066834
§ 371 (c)(1),
(2) Date: Feb. 4, 2019

(87) PCT Pub. No.: WO2018/028892
PCT Pub. Date: Feb. 15, 2018

(65) Prior Publication Data
US 2019/0182743 A1 Jun. 13, 2019

(30) Foreign Application Priority Data

Aug. 10, 2016 (EP) .................................. 16183540

(51) Int. Cl.
*H04W 36/32* (2009.01)
*H04W 36/30* (2009.01)
(Continued)

(52) U.S. Cl.
CPC .......... *H04W 36/32* (2013.01); *H04L 5/0035* (2013.01); *H04L 5/0048* (2013.01);
(Continued)

(58) Field of Classification Search
CPC ...... G06F 13/122; G06F 3/1407; G06F 3/167; G06F 9/445
See application file for complete search history.

(56) References Cited

U.S. PATENT DOCUMENTS

| 10,359,497 B1 * | 7/2019 | Azem ..................... G01S 3/023 |
| 2017/0155434 A1 | 6/2017 | Kim et al. |
| 2019/0239162 A1 * | 8/2019 | Womack ............... H04L 5/0048 |

FOREIGN PATENT DOCUMENTS

| EP | 2293473 A1 | 3/2011 |
| WO | 2014/032908 A2 | 3/2014 |
| WO | 2016/018094 A1 | 2/2016 |

OTHER PUBLICATIONS

Freescale Semiconductor, "Benefits of a 1ms Sub-Frame on the E-UTRA Uplink", 3GPP TSG RAN WG1 Ad Hoc on LTE Tdoc R1-061757, Cannes France Jun. 27-30, 2006, 4 pages.
(Continued)

*Primary Examiner* — Marisol Figueroa
(74) *Attorney, Agent, or Firm* — Xsensus LLP

(57) ABSTRACT

A terminal device comprising telecommunications transceiver circuitry configured to transmit data to and receive data from a communication node in a telecommunications network and controller circuitry configured to control the transceiver circuitry is described. The controller circuitry is configured to: determine the speed of movement of the terminal device; and control the transceiver circuitry to
(Continued)

transmit an uplink reference signal that allows the communication node to determine the channel quality between the communication node and the terminal device, wherein the rate of transmission of the uplink reference signal is determined by the speed of movement of the terminal device.

17 Claims, 8 Drawing Sheets

(51) Int. Cl.
- *H04W 36/00* (2009.01)
- *H04L 5/00* (2006.01)
- *H04W 88/00* (2009.01)
- *H04W 88/08* (2009.01)

(52) U.S. Cl.
CPC .......... *H04L 5/0051* (2013.01); *H04L 5/0073* (2013.01); *H04W 36/0083* (2013.01); *H04W 36/0085* (2018.08); *H04W 36/00837* (2018.08); *H04W 36/30* (2013.01); *H04W 88/085* (2013.01)

(56) References Cited

OTHER PUBLICATIONS

Huawei, "Uplink pilot for SC-FDMA", 3GPP TSG RAN WG1 Meeting No. 42bis R1-051191, San Diego US, Oct. 10-14, 2005, 5 pages.

Texas Instrument, "High Speed Considerations for Frame Structure Type 2", 3GPP TSG RAN WG1 Meeting No. 51 R1-074680, Jeju Korea Nov. 5-9, 2007, pp. 1-3.

Holma et al., "LTE for UMTS OFDMA and SC-FDMA based radio access", John Wiley and Sons, 2009, 11 pages.

Huawei & Hisilicon, "Considerations on New Radio Operation for Ultra Dense Networks", 3GPP TSG RAN WG1 Meeting No. 84bis R1-162164, Busan Korea, Apr. 11-15, 2016, 7 pages.

Sony, "Mobility Using Uplink Measurements", 3GPP TSG RAN WG2 Meeting No. 94 R2-163939, Nanjing China, May 23-27, 2016, 2 pages.

Ntt Docomo, "New SID Proposal: Study on New Radio Access Technology", 3GPP TSG RAN Meeting No. 71 RP-160671, Göteborg, Sweden, Mar. 7-10, 2016, 8 pages.

International Search Report dated Dec. 11, 2017 for PCT/EP2017/066834 filed on Jul. 5, 2017, 18 pages.

* cited by examiner

TERMINAL DEVICE, TELECOMMUNICATIONS NETWORKS AND METHODS

CROSS-REFERENCE TO RELATED APPLICATIONS

The present application is based on PCT filing PCT/EP2017/066834, filed Jul. 5, 2017, and claims priority to 16183540.0, filed in the European Patent Office on Aug. 10, 2016, the entire contents of each of which being incorporated herein by reference.

BACKGROUND

Field

The present disclosure relates in general but not exclusively to terminal devices, telecommunications networks and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio (NR) system/new radio access technology (RAT), networks. A Study Item for 5G/NR described in [1] has been agreed. 5G/NR is required to efficiently support connectivity for a wide range of devices associated with different applications with different characteristic data traffic profiles, resulting in various operating characteristics/requirements, such as:
  High latency tolerance
  High data rates
  Millimetre wave spectrum use
  High density of network nodes (e.g. small cell and relay nodes)
  Large system capacity
  Large numbers of devices (e.g. MTC devices/Internet of Things devices)
  High reliability (e.g. for vehicle safety applications, such as self-driving cars).
  Low device cost and energy consumption
  Flexible spectrum usage
  Flexible mobility The introduction of new radio access technology (RAT) systems/networks therefore gives rise to new challenges for providing efficient operation for devices operating in new RAT networks, including devices able to operate in both new RAT networks (e.g. a 3GPP 5G network) and currently deployed RAT networks (e.g. a 3GPP 4G network). One particular area where new approaches may be helpful is in relation to handovers between network nodes responsible for communicating with a terminal device, which may be referred to as mobility management.

In most past and existing wireless systems such as UMTS and LTE, mobility between cells or base stations is performed based on downlink measurements. In these existing systems, the User Equipment (UE) (which may take the form of a mobile terminal, or an Internet of Things device for example) would measure reference signals of its serving cell and neighbour cells and compare the signal quality of these reference signals. The UE would change its serving cell to a target neighbour cell, if the target cell's reference signal quality is higher than that of its current serving cell by a specified margin.

In a network with densely deployed cells, cell change such as handover, would be very frequent leading to large signalling overhead and interruptions and delays in the UE's connection. The known macro cell coverage design is a hexagon type cell layout. This reduces the cell change/handover because the coverage overlap is limited. By contrast, the coverage design of a dense network may be unplanned and ad-hoc in addition to having small cell radius. While a 4G network consists of eNodeBs (base stations) transmitting and receiving to/from UEs, the 5G architecture allows for a more flexible architecture where aspects of the eNodeB can be disaggregated into physically separated Transmission and Reception Points (TRP). The functions supported by a TRP may be implementation specific, but could include one or more of RF functions, baseband processing, MAC processing etc. A 5G eNodeB can itself be considered to be a TRP. Therefore, the number of cells/TRPs from which the UE can receive data could be larger. Furthermore, the amount of measurement required would increase as the TRPs are denser. In other words, there are more TRPs to measure and more frequent measurements. Therefore, the known mobile associated handover procedure based on downlink reference signal measurement at the UE and reporting of the results to the cell in order to assist handover decision at cell is not effective in NR dense cell deployments.

NR aims at a wide range of services and deployment scenarios and one of these expected deployment scenario is the dense urban scenario, i.e. a network with densely deployed cells. Recognising the high signalling overhead in using the conventional mobility method, it is proposed in 3GPP that changes in the cell (which includes TRP) are transparent to the UE. From the UE point of view, a group of TRPs can be treated as a single cell.

For example, in FIG. 1, TRP #1, TRP #2 and TRP #3 form one cluster of TRPs, i.e. Cluster 1. This cluster is treated as if it were one big cell from the UE point of view. Similarly base stations TRP #4, TRP #5 and TRP #6 form another cluster, i.e. Cluster 2. Hence, the UE is able to move between TRPs within a Cluster without any higher layer signalling or need for downlink measurements of serving and neighbouring TRPs within the cluster. As would be understood, however, the UE may still be required to perform measurements for TRPs that belong to different clusters, for example, in FIG. 1, a UE in Cluster 1 needs to measure reference signal from TRPs in Cluster 2.

Although the changes in TRPs within a cluster are transparent to the UE, the network still needs to decide which TRP within a cluster is assigned to serve the UE. In [2] & [3], it is proposed that the TRP selection is based on uplink transmission from the UE. In other words, the UE would transmit an Uplink Reference Signal (URS) periodically enabling the TRPs to measure and the network to select the TRP to serve this UE based on the measured signal quality of the URS. Periodic transmission of URS consumes UE battery power and uplink resources. Furthermore frequent uplink transmission would also increase the interference in the cell.

Hence, it is beneficial to reduce URS transmission but still maintain efficient handover between TRPs. This problem is addressed in the section entitled "Uplink Reference Signal Transmission Timing", below.

Further, in an asynchronous network, the TRPs are not aligned in time and the time difference between downlink transmissions from two different TRPs may exceed the cyclic prefix (CP) length as shown in an example in FIG. 2. Here, TRP #1 and TRP #2 are not aligned in time and the symbol from TRP #1 arrives at time $\tau_0$ whilst that from TRP #2 arrives at time $\tau_2$. The CP for TRP #1's symbol is between $\tau_0$ and $\tau_1$. Since $\tau_2 > \tau_1$, the misalignment between symbols from TRP #1 and TRP #2 falls outside of the CP length. This means orthogonality between the transmissions from TRP #1 and TRP #2 is lost. This consequently leads to interference at the UE.

It should be appreciated that such misalignment can also occur in synchronised networks if the CP is not sufficient to absorb the difference in time of arrival due to propagation delay between signals from two different TRPs. Furthermore it is also beneficial, even for the case where the misalignment is within the length of the CP, that the UE is downlink aligned with the (new) serving TRP.

The present disclosure aims to reduce such misalignment. This problem is addressed in the section entitled "Downlink Time Adjustment".

In view of these drawbacks there is a desire to provide for new approaches for handling mobility in wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 3:
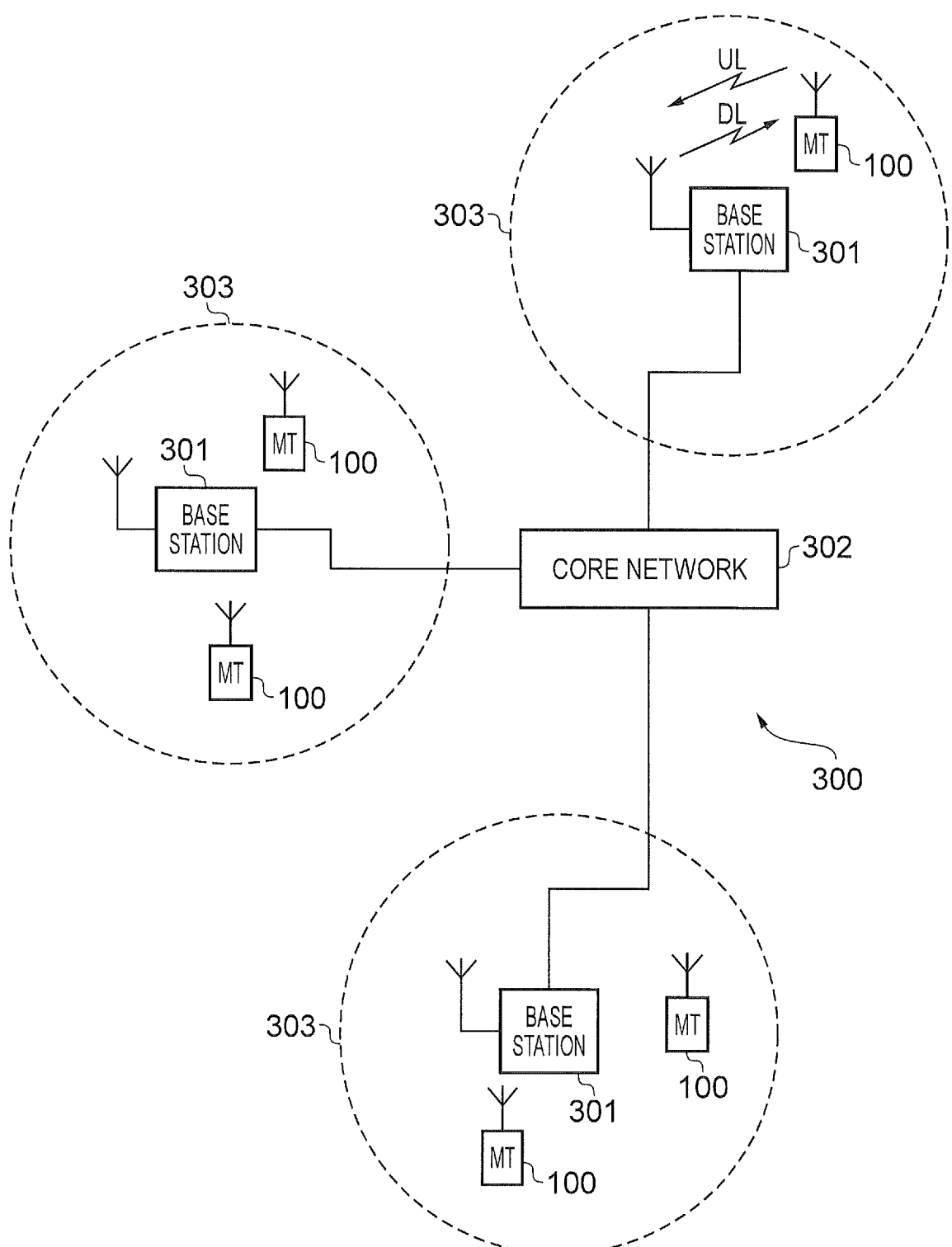
FIG. 3 schematically represents some elements of a conventional LTE-based mobile telecommunications network/system.

FIG. 3 is a schematic diagram illustrating a network architecture for an LTE-based wireless mobile telecommunications network/system 300. Various elements of FIG. 3 and their respective modes of operation are well-known and defined in the relevant standards administered by the 3GPP (RTM) body, and also described in many books on the subject, for example, Holma H. and Toskala A [4]. It will be appreciated that operational aspects of the telecommunications network represented in FIG. 3, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The network 300 includes a plurality of base stations 301 connected to a core network 302. Each base station provides a coverage area 303 (i.e. a cell) within which data can be communicated to and from terminal devices 100. Data is transmitted from base stations 301 to terminal devices 100 within their respective coverage areas 303 via a radio downlink. Data is transmitted from terminal devices 100 to the base stations 301 via a radio uplink. The core network 302 routes data to and from the terminal devices 100 via the respective base stations 301 and provides functions such as authentication, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 1:
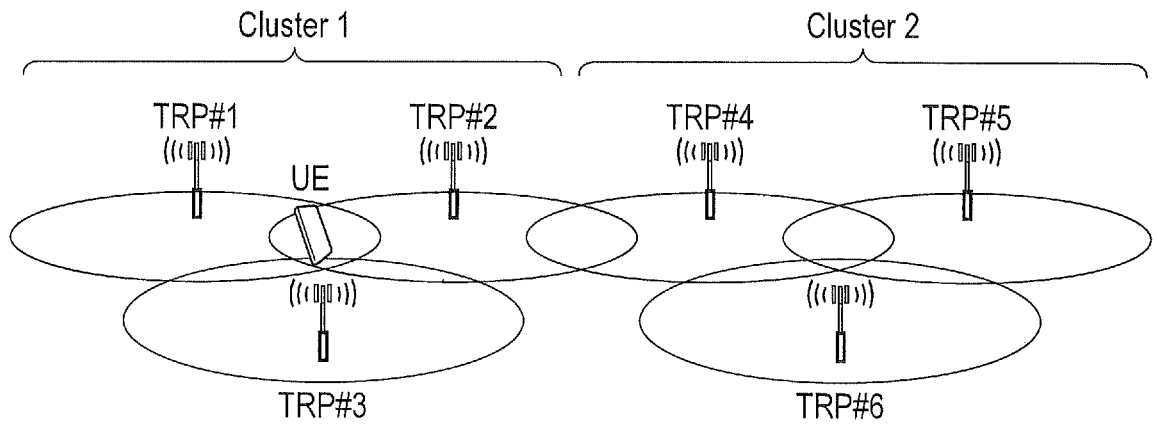
FIG. 1 schematically represents a transparent handover within a cluster of base stations.
Figure 4:
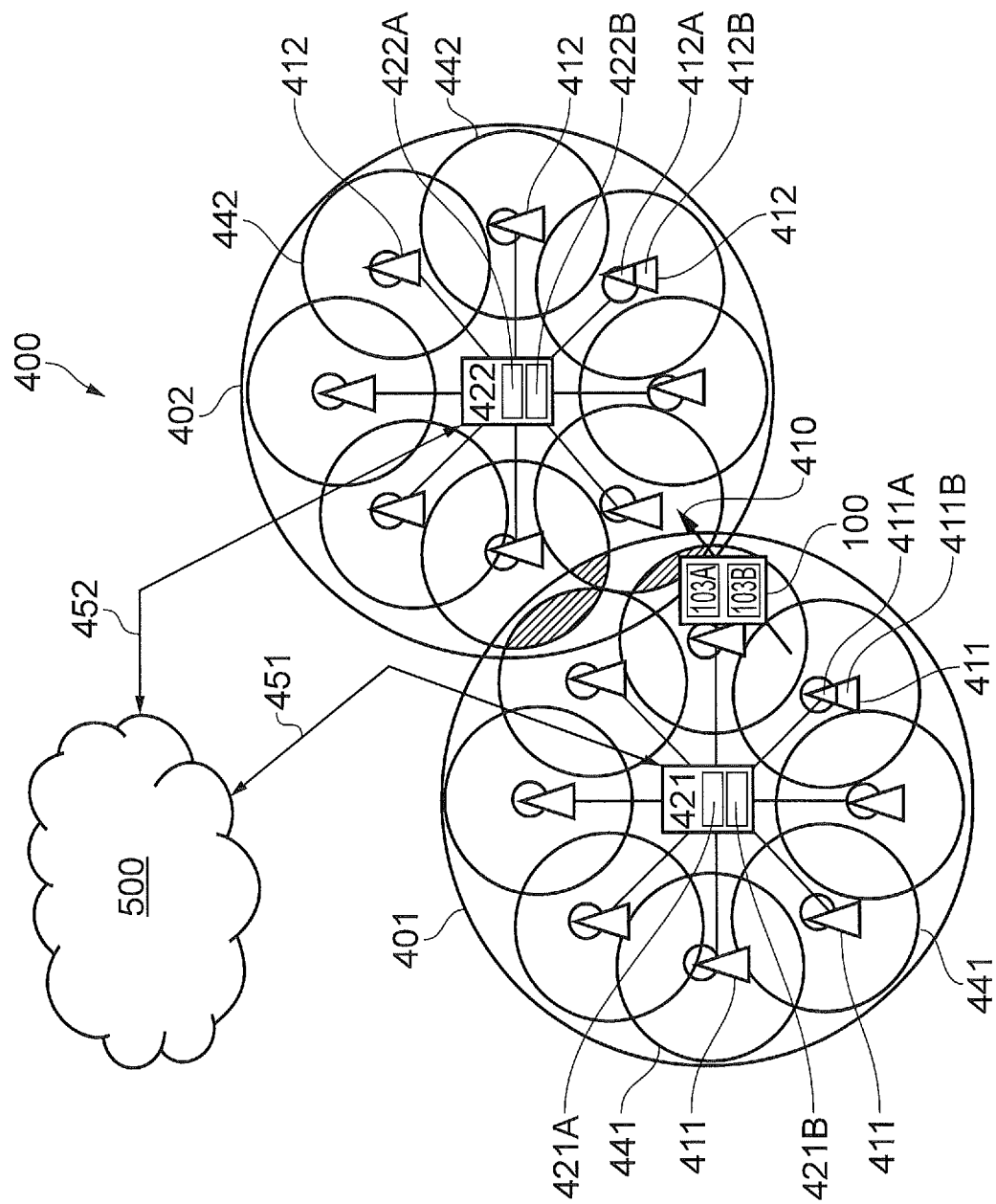
FIG. 4 schematically represents some elements of a wireless telecommunications network/system in accordance with certain embodiments of the disclosure.

FIG. 4 is a schematic diagram illustrating a network architecture for a new RAT wireless mobile telecommunications network/system 400 based on previously proposed approaches and which may be adapted to provide functionality in accordance with embodiments of the disclosure described herein. The new RAT network 400 represented in FIG. 4 comprises a first communication cell 401 (which may be a cluster of TRPs such as cluster 1 of FIG. 1) and a second communication cell 402 (which may be a cluster of TRPs such as cluster 2 of FIG. 1). Each communication cell 401, 402, comprises a controlling node (centralised unit) 421, 422 in communication with a core network component 500 over a respective wired or wireless link 451, 452. The respective controlling nodes 421, 422 are also each in communication with a plurality of distributed units (radio access nodes/ remote transmission and reception points) 411, 412 in their respective cells. Again, these communications may be over respective wired or wireless links. The distributed units 411, 412 are responsible for providing the radio access interface for terminal devices connected to the network. Each distributed unit 411, 412 has a coverage area (radio access footprint) 441, 442 which together define the coverage of the respective communication cells 401, 402.

In terms of broad top-level functionality, the core network component 500 of the new RAT telecommunications system represented in FIG. 4 may be broadly considered to correspond with the core network 302 represented in FIG. 3, and the respective control nodes 421, 422 and their associated distributed units 411, 412 may be broadly considered to provide functionality corresponding to base stations of FIG. 3.

A UE (which will be termed "terminal device" hereinafter) 100 is represented in FIG. 4 within the coverage area of the first communication cell 401. This terminal device 100 may thus exchange signalling with the first controlling node 421 in the first communication cell via one of the distributed units 411 associated with the first communication cell 401. For simplicity the present description assumes communications for a given terminal device are routed through one of the distributed units, but it will be appreciated that in some implementations communications associated with a given terminal device may be routed through more than one of these units, for example in a soft handover scenario. That is to say, references herein to communications being routed through one of the distributed units should be interpreted as references to the occasion being routed through one or more of the distributed units.

The controlling node 421 is responsible for determining which of the distributed units 411 spanning the first communication cell 401 is responsible for radio communications with the terminal device 100 at any given time. Typically this will be based on measurements of radio channel conditions between the terminal device 100 and respective ones of the distributed units 411. In at least some implementations the involvement of the distributed units is transparent to the terminal device 100. That is to say, the terminal device is not aware of which distributed unit is responsible for routing communications between the terminal device 100 and the controlling node 421 of the communication cell 401 in which the terminal device is currently operating. The controlling node 421 and/or the distributed unit may either individually or in combination, be referred to as a communication node hereinafter. That is to say, so far as the terminal device is aware, it simply transmits uplink data to the controlling node 421 and receives downlink data from the controlling node 421 and the terminal device has no awareness of the involvement of the distributed units 411. In other embodiments, a terminal device may be configured with one or more of the distributed nodes and be aware of which distributed unit(s) are involved in its communication. Switching and scheduling of the one or more distributed units is done at the network controlling unit based on measurements by the distributed units of the terminal device uplink signal or measurements taken by the terminal device and reported to the controlling unit via one or more distributed units.

In the example of FIG. 4, two communication cells 401, 402 and one terminal device 100 are shown for simplicity, but it will of course be appreciated that in practice the system may comprise a larger number of communication cells (each supported by a respective controlling node and plurality of distributed units) serving a larger number of terminal devices.

It will further be appreciated that FIG. 4 represents merely one example of a proposed architecture for a new RAT telecommunications system in which approaches in accordance with the principles described herein may be adopted, and the functionality disclosed herein for handling mobility/ handovers in a wireless telecommunications system may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

The terminal device 100 comprises a transceiver unit 100A for transmission and reception of wireless signals and a processor unit 100B configured to control the terminal device 100. The processor unit 100B may comprise various sub-units for providing functionality in accordance with embodiments of the present disclosure as explained further herein. These sub-units may be implemented as discrete hardware elements or as appropriately configured functions of the processor unit. Thus the processor unit 100B may comprise a processor unit which is suitably configured/ programmed to provide the desired functionality described herein using conventional programming/configuration techniques for equipment in wireless telecommunications systems. The transceiver unit 100A and the processor unit 100B are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated that the terminal device 100 will in general comprise various other elements associated with its operating functionality, for example a power source, user interface, positioning information such as GPS and so forth, but these are not shown in FIG. 4 in the interests of simplicity.

The first and second controlling nodes 421, 422 in this example are functionally identical but serve different geographical areas (cells 401, 402). Each controlling node 421, 422 comprises a transceiver unit 421A, 422A for transmission and reception of communications between the respective controlling nodes 421, 422 and distributed units 412, 422 within their respective communication cells 401, 402 (these communications may be wired or wireless). Each controlling node 421, 422 further comprises a processor unit 421B, 422B configured to control the controlling node 421, 422 to operate in accordance with embodiments of the present disclosure as described herein. The respective processor units 421B, 422B may again comprise various sub-units for providing functionality in accordance with embodiments of the present disclosure as explained herein. These sub-units may be implemented as discrete hardware elements or as appropriately configured functions of the processor unit. Thus, the respective processor units 421B, 422B may comprise a processor unit which is suitably configured/programmed to provide the desired functionality described herein using conventional programming/configuration techniques for equipment in wireless telecommunications systems. The respective transceiver units 421A, 422A and processor units 421B, 422B for each controlling node 421, 422 are schematically shown in FIG. 4 as separate elements for ease of representation. However, it will be appreciated the functionality of these units can be provided in various different ways, for example using a single suitably programmed general purpose computer, or suitably configured application-specific integrated circuit(s)/circuitry. It will be appreciated that the controlling nodes 421, 422 will in general comprise various other elements, for example a power supply, associated with their operating functionality.

The respective distributed units 411, 412 in this example are functionally identical but serve the different parts of the respective communications cells 401, 402 as schematically indicated in FIG. 4. Each distributed unit 411, 412 comprises a transceiver unit 411A, 412A for transmission and reception of communications between the respective distributed units 411, 412 and their associated controlling node 421, 422 and also for transmission and reception of wireless radio communications between the respective distributed units 411, 412 and any terminal device they are currently supporting. Each distributed unit 411, 412 further comprises a processor unit 411B, 412B configured to control the operation of the distributed unit 411, 412 in accordance with the principles described herein. The respective processor units 411B, 412B of the distributed units may again comprise various sub-units. These sub-units may be implemented as discrete hardware elements or as appropriately configured functions of the processor unit. Thus, the respective processor units 411B, 412B may comprise a processor unit which is suitably configured/programmed to provide the desired functionality described herein using conventional programming/configuration techniques for equipment in wireless telecommunications systems. The respective transceiver units 411A, 412A and processor units 411B, 412B are schematically shown in FIG. 4 as separate elements for ease of representation. However, it will be appreciated the functionality of these units can be provided in various different ways, for example using a single suitably programmed general purpose computer, or suitably configured application-specific integrated circuit(s)/circuitry. It will be appreciated that the distributed units 411, 412 will in general comprise various other elements, for example a power supply, associated with their operating functionality.

As discussed above, with conventional telecommunications systems, mobility management is performed on the basis of measurements by a terminal device of downlink signals broadcast by radio network access points (i.e. base stations in an LTE context). In the content of the system of FIG. 4, LTE mobility management is not suitable. Firstly the terminal device would need to perform a large number of downlink measurements due to the number of distributed units. Further, from the terminal device point of view, the distributed nodes look identical. This may make the distributed nodes unidentifiable.

To help address these issues in the telecommunications system 400 of FIG. 4, rather than the terminal device 100 performing measurements on downlink signalling transmitted by radio access nodes for the network, the terminal device 100 instead transmits reference signalling which can be measured by radio access nodes in the communication cell associated with the controlling node to which the terminal devices is currently connected. Based on these measurements, the controlling node for the communication cell may determine which of the (one or more) distributed units/radio network access nodes is most appropriate for supporting communications between the controlling node and the terminal device, and configure their operation accordingly. The specific manner in which the controlling nodes are configured to route communications through the desired distributed unit(s) for a given terminal device is not significant to the principles described herein.

Thus, the radio/channel conditions associated with a communication path between a terminal device and respective ones of the distributed units in a communication cell in which the terminal device 100 is operating may be determined based on measurements of a characteristic of uplink reference signalling (URS) transmitted by the terminal device and received by the respective ones of the distributed units. There are a number of different characteristics of uplink reference signalling that may be measured to determine an indication of radio channel conditions associated with a radio path between the terminal device and each respective radio network access node/distributed unit receiving the reference signalling in the communication cell in which the terminal device is operating. For example, the measured characteristic may be an indication of the received signal strength or quality of the reference signalling, and the controlling node 421 may control the radio access node reporting the highest signal strength or quality of the reference signalling to be the serving node for the terminal device. As a more specific example, the signal strength or quality of a known sequence of reference symbols of the reference signalling could be the measured characteristic. Furthermore, the controlling node may also take other information into account in addition to the indications of the relevant reference signal characteristic measurements received from the various radio network access nodes in the selection of the serving node, for example load balancing related information.

In accordance with certain embodiments of the disclosure, in addition to using reference signalling from the terminal device to help a controlling node determine which is the most appropriate distributed unit/radio access node through which to route communications to and from a terminal device operating within the controlling node's communication cell, uplink reference signalling may also be used to support handover procedures in the wireless telecommunications system 400.

As discussed above, the terminal device 100 represented in FIG. 4 is communicating with the controlling node 421 of communication cell 401 via one of the distributed units 411 selected by the controlling node based on measurements of uplink reference signalling from the terminal device 100 by respective ones of the distributed units 411. However, it is assumed here the terminal device is moving in the direction indicated by the arrow 410 so that it is in the process of moving out of coverage of the first communication cell 401, and into coverage of the second communication cell 402 associated with the second controlling node 422. Accordingly, the terminal device 100 should be handed over from the first controlling node 421 associated with the first communication cell 401 to the second controlling node 422 associated with the second communication cell 402.

Uplink Reference Signal Transmission Timing

As a first part of the disclosure, and as noted above, as the terminal device 100 moves around the first communication cell 401 and between the first and second communication cells, the terminal device periodically transmits a URS so that the controlling node can decide whether to change the distributed node with which the terminal device communicates. The URS is a signal that allows the receiving node (for example a base station, or distributed node) to determine the channel quality between the receiving node and the terminal device.

It has been recognised by the inventors that as the speed of the terminal device 100 increases, the terminal device will move between various communication areas 441, 442 more often. Accordingly, as the controlling node may wish to change the distributed node with which the terminal device communicates, more frequently, it would be desirable to transmit the URS more often. In other words, as the speed of movement of the terminal device 100 increases, the time between consecutive URS transmissions decreases. That is, adjusting the rate of URS transmission based on the speed of the terminal device 100 so that, in embodiments, the rate of URS transmission increases as the speed of the terminal device increases. This recognises that a fast moving terminal device would change distributed node more often than a slow moving terminal device 100. This also recognises that a target distributed node (i.e. a distributed node to which the terminal device will move) would benefit from frequent URS measurements from a fast moving terminal device 100. For example, the target distributed node would benefit from more frequent URS measurements from a terminal device 100 that is moving towards the target distributed node.

The speed of the terminal device 100 can be determined using a number of different techniques. For example, the terminal device 100 can determine its speed based on sensors located within the terminal device 100 such as GPS positioning, or WiFi positioning or, indeed, based on changes in Doppler during channel estimation.

Of course, as would be appreciated, although the absolute speed of the terminal device 100 may be measured, the speed of the terminal device relative to the distributed nodes may also be measured and used to adjust the rate of URS transmission. Both of these alternatives are envisaged by the disclosure.

In an embodiment, the terminal device 100 is configured with an URS transmission rate function. An example of this function is shown in FIG. 5.

In this function, the main input is the terminal device speed. For example, in FIG. 5, a linear function giving a relationship between the URS transmission rate and UE speed can be used. The configuration information required by the terminal device 100 would simply consist of the slope of this linear function. The configuration information may be provided by the controlling node over the air or may be stored on the terminal device 100.

In addition to the speed of the terminal device, other factors such as the size of the communication area affects the rate of change of distributed nodes. For example, FIG. 5 shows two linear functions $F_1$ and $F_2$ with slope $\alpha$ and $\beta$ respectively where $\alpha > \beta$ and $F_1$ is used for a small coverage area of a distributed node whilst $F_2$ is used for a large coverage area of a distributed node. In this case, the controlling node will send, via the distributed node with which this the terminal device 100 is communicating, data identifying the linear function to use. This may be simply the value of $\alpha$ or $\beta$, or may be an indication to the terminal device 100 to retrieve preset values for $\alpha$ or $\beta$ stored within the terminal device 100.

Figure 5:
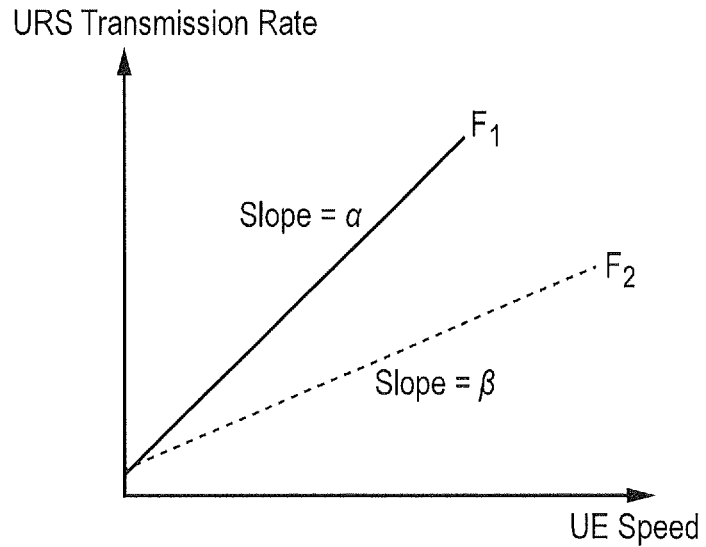
FIG. 5 shows an Uplink Reference Signal (URS) transmission rate function.

Hence, a URS transmission rate function, such as that described in FIG. 5 would provide the network flexibility in adjusting the URS transmission rate. The URS transmission rate parameters may be configured by higher layers e.g. be broadcast in the system information or may be sent to the terminal device 100 using dedicated signalling, e.g. from the dedicated signalling used when terminal device 100 is configured with URS transmission or indicated in a physical layer command such as Downlink Control Information (DCI).

In embodiments, the URS transmission rate can also be a function of other parameters. In one example, the URS can also be a function of the downlink channel quality (e.g. Reference Signal Received Power—RSRP) measured by the terminal device 100. In an example embodiment, the terminal device 100 determines a URS transmission rate of $R_{URS\_actual}$ based on both the speed of the terminal device 100 and a multiplier $M_{URS}$. In other words, the terminal device 100 determines the URS transmission rate based on speed $R_{URS\_speed}$ from the function $F_1$ or $F_2$ of FIG. 5 and to this a multiplier is applied. This multiplier may be determined based on various parameters. However, in the example noted above, the multiplier is based on the downlink channel quality. Specifically, the terminal device 100 device derives the multiplier, $M_{URS\_RSRP}$, from the measured RSRP. The URS transmission rate used by the terminal device 100 $R_{URS\_actual}$, is the product of these two parameters as per equation (1) below:

$$R_{URS\_actual} = R_{URS\_speed} \times M_{URS\_RSRP} \qquad \text{Equation (1)}$$

Note that the multiplier, $M_{URS\_RSRP}$, can increase or decrease as a function of RSRP:

- It is advantageous to increase $M_{URS\_RSRP}$ as RSRP changes. For example, RSRP decreases for terminal devices 100 at the edge of the cell (or the coverage area) since the timing of any potential handover becomes more critical for those terminal devices.
- On the other hand, it can be advantageous instead to increase $M_{URS\_RSRP}$ as RSRP increases, since the path loss to a neighbouring cell (or coverage area) increases as RSRP to the current serving cell increases. This is because the distributed node in the neighbouring cell or coverage area measures the URS in order to determine whether a handover should occur. In this case, it is helpful to increase the number of repetitions for the URS when the RSRP of the serving cell is high In other embodiments, the network can indicate to a terminal device 100 to stop URS transmission. This is beneficial if the terminal device 100 is already transmitting uplink packets e.g. data or other control information and hence there is no need to also transmit URS.

In other embodiments, a minimum URS transmission rate is set for a terminal device 100. For a terminal device 100 that is stationary, it is also beneficial to transmit URS especially if it is within coverage of multiple distributed nodes since changes in the radio conditions may cause a neighbouring distributed node to be more favourable than the serving distributed node.

In other embodiments, a maximum URS transmission rate is set for the terminal device 100. For a terminal device 100 in a car or train, the terminal device speed can lead to excessive URS transmission. This would consume a significant amount of resources and battery power. Furthermore, a maximum URS transmission rate enables the network to determine the most resources (e.g. in time) to reserve for a particular terminal device.

Figure 6:
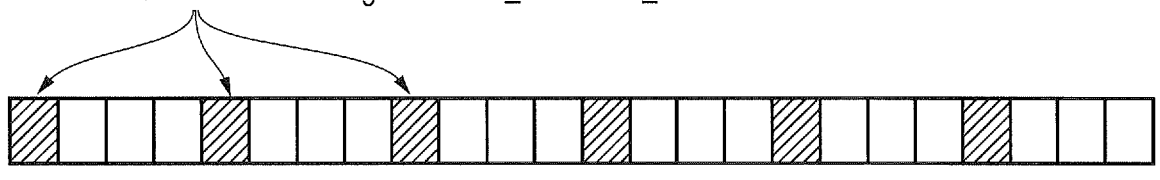
FIGS. 6 and 7 shows resources assigned for the URS.
Figure 6:
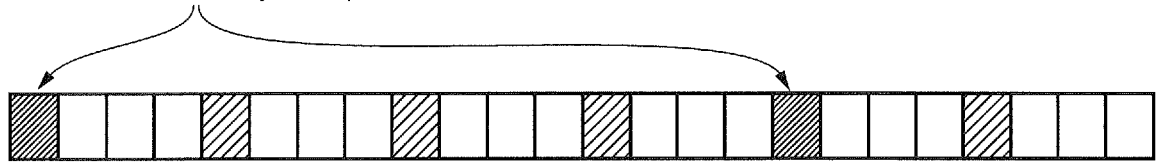
Figure 6:
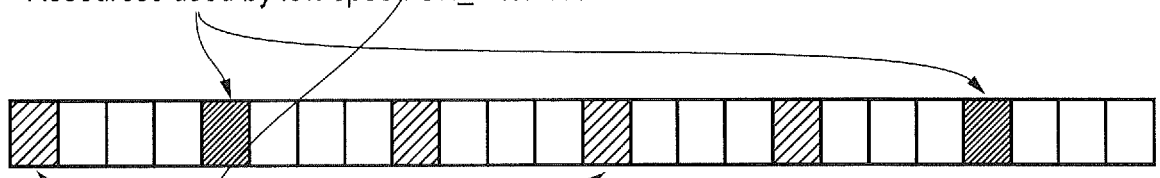
Figure 7:
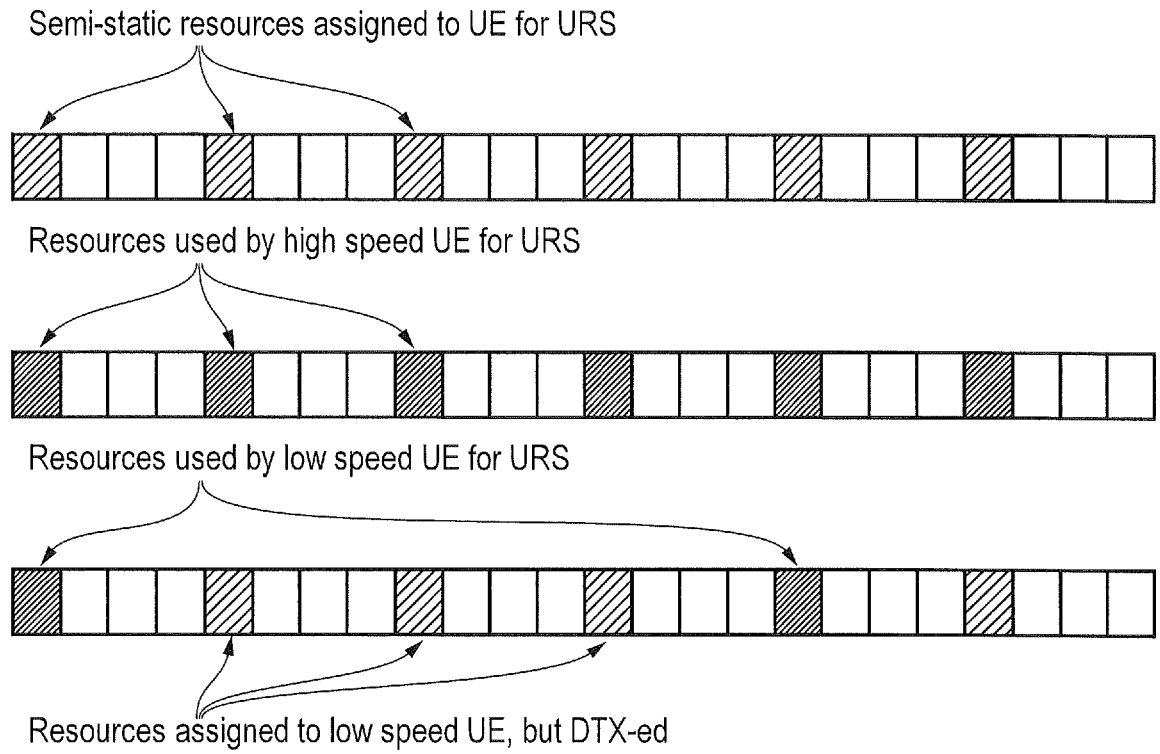

In embodiments, the terminal device 100 is semi-statically configured with resources in which to transmit the URS. In other words, the terminal device 100 is provided with specific time resources in which to transmit the URS. The resources may be time resources (e.g. subframes or symbols within subframes) or other resources such as codes or frequencies (e.g. for multiplexing of multiple UEs' URS transmission) or sets of subcarriers. The terminal device 100 transmits URS in these resources at up to the maximum transmission rate. If the terminal device 100 transmits URS at a rate that is lower than the maximum transmission rate, it does not transmit (DTX) one or more of the URS. This is shown in FIGS. 6 and 7. FIG. 6 shows a device transmitting URS at a low rate by DTX-ing some URS whereas the device transmitting URS at a high rate uses all of the semi-statically assigned time resources.

Different terminal devices 100 can be assigned different phases in which to DTX the URS, if they are transmitting at less than the maximum transmission rate. This is shown in FIG. 6, where terminal devices 100 travelling with low speed (i.e. not at maximum URS rate) are assigned to transmit resources at different times. This can help to alleviate interference between URS transmitted by different terminal devices 100 in the same or neighbouring coverage areas.

When terminal devices transmit at less than the maximum transmission rate, the times at which they transmit URS may be based on a code. For example, a code can be defined such that there are times at which only one terminal device is transmitting URS (at other times there may be collisions between URS). Given that the controlling nodes and distributed nodes know which codes are applied to which terminal devices, these network entities can apply more weight to measurements based on URS that do not collide.

In an embodiment, a scrambling code is applied to the URS sequence, where the code indicates the transmission rate of the URS. This can help the distributed node or controlling node determine when the terminal device is not transmitting (i.e. DTX) the URS if the terminal device 100 is not indicated a URS transmission rate by the network (i.e. for the case that the UE autonomously determines its URS transmission rate). This is because it can be useful for the network to know whether it is not receiving URS due to DTX from the terminal device 100 or due to poor channel conditions. The scrambling code for the URS can be applied in the frequency domain. For example, the modulation symbol sequence applied to the subcarriers of the URS is a function of the transmission rate of the URS.

In another embodiment, the resource used to transmit the URS is indicated in a DCI. This resource can be changed, e.g. by DCI, to provide flexibility for the network in scheduling its resources. The allocated resources for URS will be shared among the neighbour coverage area within a cluster (for intra-cluster mobility) or between clusters (for inter-cluster mobility)

In another embodiment the resources used to transmit the URS is indicated by higher layers such as Radio Resource Control (RRC) signalling. The resources used by the terminal device to transmit URS are shared with other distributed nodes in the same clusters and distributed nodes in other neighbouring clusters.

Figure 8:
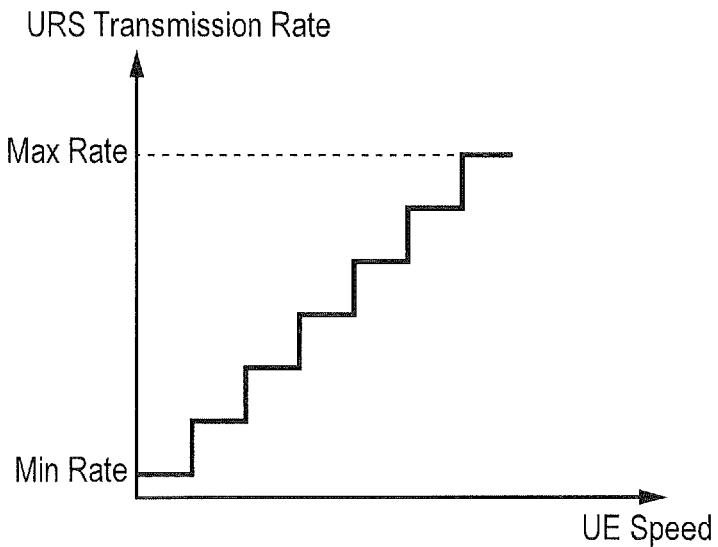
FIG. 8 shows a quantised URS transmission rate function.

In another embodiment, the terminal device changes its rate of URS transmission in quantised steps of speed. That is, the terminal device only changes its URS transmission rate by a determined amount if the speed changes by $\pm\Delta_V$. For example, the terminal device 100 may change its URS transmission rate in steps of 10 km/h. That is, for example, the URS transmission rate is increased when the terminal device speed changes from 10 km/h to 20 km/h but it does not change if the speed is 15 km/h. An example URS transmission rate function following this is shown in FIG. 8.

In another embodiment, the network measures the speed of the terminal device as the change in the number of distributed nodes that the UE is served by per unit time. Here the network would indicate to the terminal device to change its rate of URS transmission for example using a DCI or RRC signalling based on the network determined speed.

In another embodiment, the terminal device 100 changes its rate of URS transmission based on the channel conditions/characteristics. The channel conditions can be characterised based on a number of channel characteristics such as multipath and symbol delay spread, etc. In this case, the terminal device can have a different URS transmission rate (function) if the channel conditions are outdoor/indoor or urban/suburban.

In another embodiment, the terminal device rate of URS transmission can be different among terminal device characteristics in certain conditions. For example when the URS transmission of a terminal device is changed among Tx antennas of the terminal device. In low battery conditions, the rate of URS can be not only reduced but also alternate between different antennas such as Tx1 and Tx2 or indeed only one Tx antenna may be used.

In addition to modifying the rate of transmission of the URS, the used resource (e.g. Subframe, frequency, or code) or an indication encoded in the URS may also change. This allows the network to detect the terminal device speed based on the uplink signal, and in case of using different resources, separates the resources used by faster moving and slower moving terminal devices.

Further, the URS rate may be reduced by the terminal device 100 when the remaining battery is below a threshold.

In another embodiment, the network can measure the cell traffic load or uplink interference. The network can indicate to a terminal device 100 to reduce the URS transmission power (for example, maximum allowed power is indicated by DCI) in addition to the rate reduction of URS transmission. This is beneficial if uplink interference reduction is required due to a dense deployment or the necessity of cell load control. Additionally, the network may allow high power transmission for high speed terminal devices and may restrict transmission power for low speed terminal devices. The change of power level should be notified among neighbouring distributed nodes in order for a fair comparison.

Figure 9:
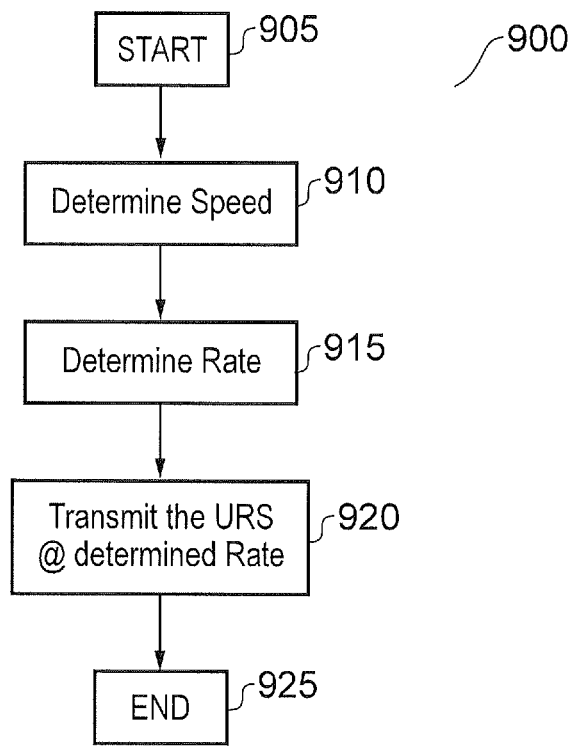
FIG. 9 shows a flowchart according to embodiments.

FIG. 9 shows a flow diagram describing embodiments. The process 900 will be carried out by the terminal device 100. The process starts at step 905. The speed of the terminal device 100 can be determined in step 910 using positioning circuitry with the terminal device such as GPS circuitry or other means such as network positioning or by measuring Doppler. The rate of URS transmission will be calculated in step 915 using the function of FIG. 5 or FIG. 8. The URS will be transmitted by the terminal device 100 at the determined rate in step 920 and the process will end at step 925.

Downlink Time Adjustment

As noted above, particularly in an asynchronous network (although the disclosure is applicable to synchronous networks), the downlink transmissions received by the terminal device 100 from two distributed nodes 421, 422 within the coverage area may exceed the cyclic prefix time. In this case, orthogonality between the transmissions is lost which results in increased interference.

Accordingly, according to embodiments of the disclosure, a Downlink Timing Adjustment command (DTA) is introduced that is sent from the network (via the distributed node) to the terminal device 100. The DTA indicates to the terminal device 100 the amount of time that should be adjusted in the downlink so that the downlink aligns with the target distributed node. In other words, the DTA is a signal including a time adjustment value required to synchronise the downlink from the two distributed nodes.

In embodiments, the DTA command is transmitted using either a physical layer command such as Downlink Control Information (DCI) or in a MAC layer message. By transmitting the DTA command in either of a physical layer or MAC layer, higher layer (RRC) signalling would be avoided thereby maintaining the transparent change of distributed nodes at the higher layers within the terminal device 100.

It should be appreciated that the serving distributed node can consist of more than one distributed node where these distributed nodes operate in a Co-Ordinated Multipoint (COMP) or Single Frequency Network manner. Similarly, a target distributed node can consist of more than one distributed node where these distributed nodes operate in a COMP or Single Frequency Network manner.

Figure 2:
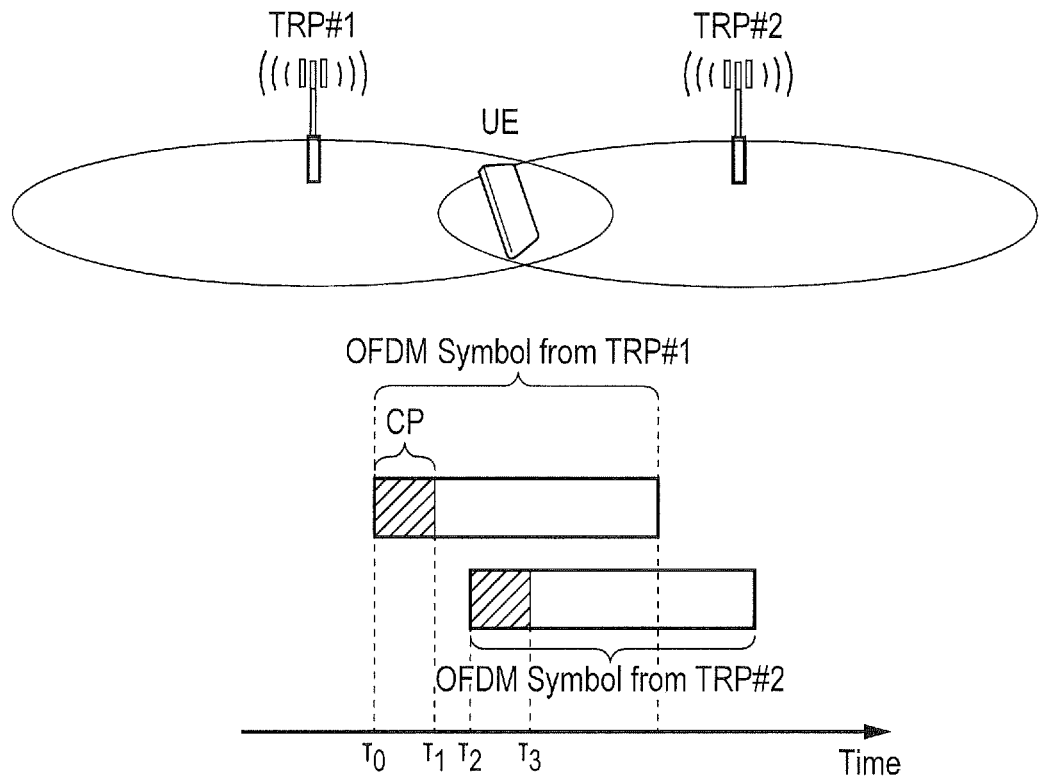
FIG. 2 schematically represents time misalignment that exceeds a cyclic prefix length.

In an embodiment, the DTA consists of the downlink time difference $\Delta_{TDL}$ between the serving distributed node and target distributed node. For example, with reference to FIG. 2, $\Delta_{TDL}=\tau_2-\tau_0$, i.e. the difference between the boundary of symbols from TRP #1 and TRP #2.

Figure 10:
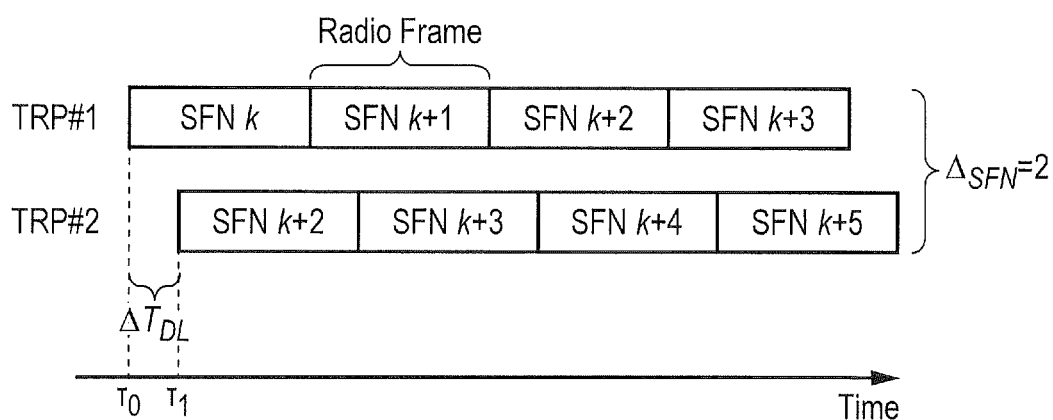
FIG. 10 shows System Frame Number differences between unsynchronised distributed nodes.

In an embodiment, the DTA consists of the System Frame Number (SFN) difference between the serving distributed node and target distributed node. This embodiment is beneficial in asynchronous networks where the SFNs during the time of distributed node change may be different between the two distributed nodes. It will be understood that the SFN is used for many functions, for example in DRX to determine the wake up time, time to execute a command, etc. An example of this embodiment is shown in FIG. 10 where TRP #1 and TRP #2 are two neighbouring distributed nodes that are asynchronous such that their SFN and frame boundary are not aligned.

TRP #1 serves a terminal device that is to be handed over to TRP #2 and hence using this embodiment, the DTA would indicate the SFN difference $\Delta_{SFN}$ which in this example is 2 radio frames. The terminal device would then offset its SFN by $\Delta_{SFN}$ so that its existing functions are not impacted.

Figure 11:
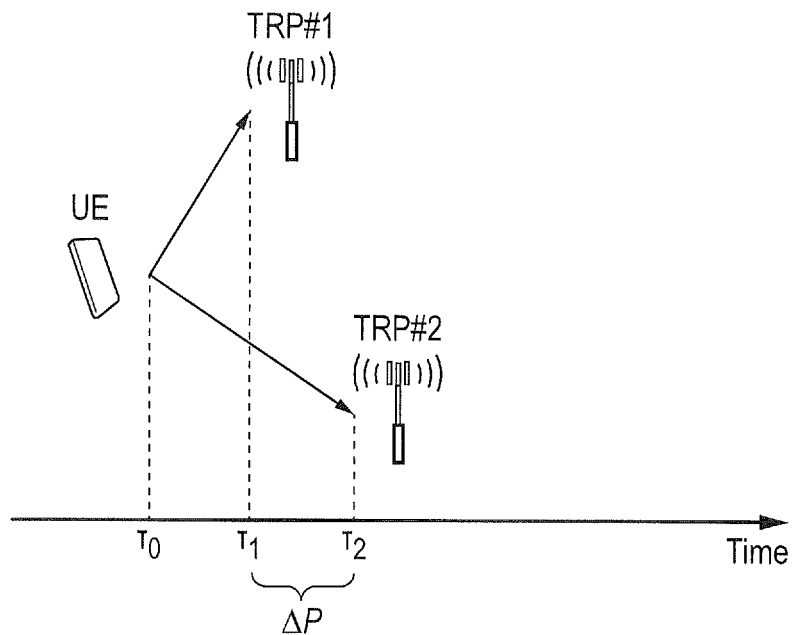
FIG. 11 shows a difference in propagation delay.

In an embodiment, the DTA consists of the difference in propagation delay $\Delta P$ between the serving distributed node and the target distributed node. $\Delta P$ can be calculated by taking the difference in time of arrival of the URS at the serving distributed node and the target distributed node as shown in an example in FIG. 11. Here the terminal device transmits the URS at time $\tau_0$ and the URS arrives at TRP #1 and TRP #2 at time $\tau_1$ and $\tau_2$ respectively. The difference in propagation delay is therefore $\Delta P=\tau_2-\tau_1$. Typically, the handover point has similar propagation delay and $\Delta P$ can be absorbed in the Cyclic Prefix but it is possible in some scenarios that $\Delta P$ can be large (which, for example, could be greater than the Cyclic Prefix). This may occur where distributed nodes have different coverage areas. It should also be appreciated that the total difference in frame boundary timing, as illustrated by FIG. 10 is due to the sum of $\Delta P$ and $\Delta T_{DL}$. In this case, the combination of both $\Delta P$ and $\Delta T_{DL}$ may not be absorbed by the Cyclic Prefix.

In an embodiment, the DTA contains an offset value $\Delta_{OFFSET}$ that includes all the factors that lead to a difference in downlink timing between serving and target distributed nodes. For example, the offset value $\Delta_{OFFSET}$ contains the propagation delay difference and timing difference between the serving and target distributed nodes. That is $\Delta_{OFFSET}=\Delta P+\Delta T_{DL}$. The terminal device would therefore need to only use this one value (i.e. $\Delta_{OFFSET}$) to adjust its timing offset rather than multiple values.

In an embodiment, the DTA is sent to the terminal device 100 by the network if the Cyclic Prefix cannot absorb the difference in timing between the serving distributed node and target distributed node. That is, if $\Delta_{OFFSET}>$Cyclic Prefix length. The network can decide this because the network knows the length of time of the Cyclic Prefix and the $\Delta_{OFFSET}$ and so can make this determination. By conditionally sending the DTA in this way, the amount of data transmitted around the network is reduced. If the Cyclic Prefix can absorb the time misalignment then there is no loss in orthogonality in the downlink and the terminal device. The terminal device can realign the symbol boundary after it has changed to the target distributed node. In this scenario, it is possible for both distributed nodes to transmit the same downlink data to the terminal device during the change of distributed node without any loss in orthogonality and as the serving distributed node's signal becomes weaker, the terminal device 100 will gradually align itself to the signal from the target distributed node (which would become its new serving distributed node).

It should be appreciated that the DTA can include one or more of the items of information described in the above embodiments. That is the DTA can include one or more of the described parameters namely $\Delta T_{DL}$, $\Delta P$, $\Delta_{OFFSET}$ and $\Delta_{SFN}$.

Figure 12:
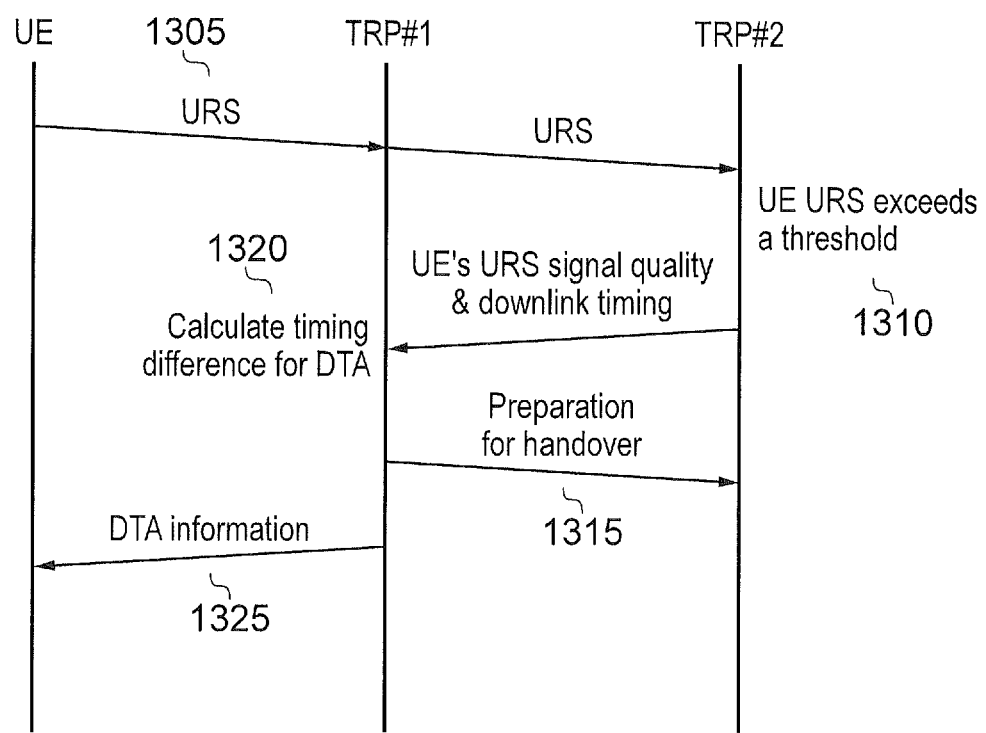
FIG. 12 shows a signalling diagram for exchanging downlink timings.

In an embodiment, the DTA information is determined by exchanging downlink timing information between the serving and target distributed nodes. An example signalling is shown in FIG. 12, where the terminal device 100 is being served by TRP #1 and TRP #2 is a target distributed node.

The terminal device transmits the URS in step 1305, which is received by both TRP #1 and TRP #2. When the terminal device 100 URS exceeds a threshold level at TRP #2, it triggers TRP #2 to send a message to TRP #1 informing that the terminal device 100 served by TRP #1 exceeds this threshold and also include the received URS signal quality and the downlink timing (which may be, for example, a frame boundary time with respect to a global time). This is step 1310. TRP #1 decides whether the URS signal quality reported by TRP #2 is sufficient for a change in distributed node. This decision may be made, for example, based on whether the URS received by TRP #2 is higher than that received by TRP #1 by a predetermined margin. In this example, a distribution node TRP #1 decides a change is beneficial and so TRP #1 sends a preparation message for the change of serving distribution node to TRP #2. This is step 1315. Using the downlink timing of TRP #2, TRP #1 calculates the timing difference such as $\Delta_{OFFSET}$ and $\Delta_{SFN}$ required in the DTA. This is step 1320. TRP #1 then sends the DTA to the terminal device 100 in step 1325. The terminal device 100 re-adjusts its downlink alignment and starts receiving from TRP #2.

It should be appreciated that this is one example of DTA information exchange and other possible signalling methods that includes the exchange of DTA information is feasible.

In the previous embodiments, the network determines the downlink timing differences. It is feasible that the terminal device 100 determines the downlink timing differences.

In another embodiment, the DTA contains a command to instruct the terminal device 100 to measure or detect a reference signal from the target distributed node. This reference signal may be a Target Reference Signal (T-RS). The T-RS is a signal that has a sequence known to the terminal device. The T-RS is transmitted by the target distributed node and consists of a known sequence to the terminal device 100. The terminal device 100 detects and measures this T-RS to determine the downlink timing of the target distributed node. The T-RS only needs to be transmitted by the target distributed node during a change of distributed node. For example, the T-RS will only be transmitted after it is determined that the terminal device 100 would be moving to the target distributed node.

It should be noted that this is different to known techniques where the reference signal is always transmitted regardless of whether any terminal device is handing over to it. However, in these embodiments, the T-RS is only transmitted when triggered. This embodiment is advantageous since it does not consume resources when the reference signal is not needed unlike known techniques.

Further, upon receipt of the DTA instruction to detect and measure the T-RS, the terminal device can indicate to the serving distributed node that it has obtained the downlink timing of the target distributed node and therefore indicates that the terminal device is ready to change distributed nodes. This indication can be in the form of a URS. For example a different URS sequence may be used by the terminal device to indicate to the serving and target distribution nodes that it is ready to change distribution nodes.

In another embodiment, the DTA instruction to detect and measure T-RS can be sent together with other DTA parameters such as $\Delta_{OFFSET}$ and $\Delta_{SFN}$, which can help the terminal device in the detection process. It should also be appreciated that the T-RS can help the terminal device refine its downlink timing since the DTA parameters, such as $\Delta_{OFFSET}$, would only give a rough estimation of the timing.

In previous embodiments, the terminal device 100 changes its downlink timing to adapt to the target distribution node's timing. It is feasible for the target distribution node to adjust its timing to align with that of the terminal device. Hence, in another embodiment, the serving distribution node signals DTA related information e.g. $\Delta_{OFFSET}$ and $\Delta_{SFN}$, to the target distribution node to enable the target distribution node to adjust its downlink transmission so that it aligns with that of the terminal device. This would enable a smooth change of distribution node. It should be appreciated that this timing adjustment is only required if the difference in downlink timing is larger than that of the Cyclic Prefix length.

The target distribution node would serve multiple target devices and it may be difficult to maintain orthogonality among these terminal devices if each of them has different downlink timing due to changes in distribution node from neighbouring distribution nodes. Recognising this, in another embodiment, the target distribution node would initially adjust its downlink timing to align with that of the terminal device as in a previous embodiment. When the serving (i.e. previous) distribution node indicates to the target distribution node that it would stop serving this terminal device, (e.g. ceases to transmit downlink signal to this terminal device), the target (i.e. new serving) distribution node slowly moves its downlink timing back to its original timing.

In another embodiment, the target distribution node that has aligned with the terminal device's downlink timing would send a DTA command to this terminal device, instructing it to change its downlink timing so that it is aligned with the target distribution node's original timing.

Figure 13:
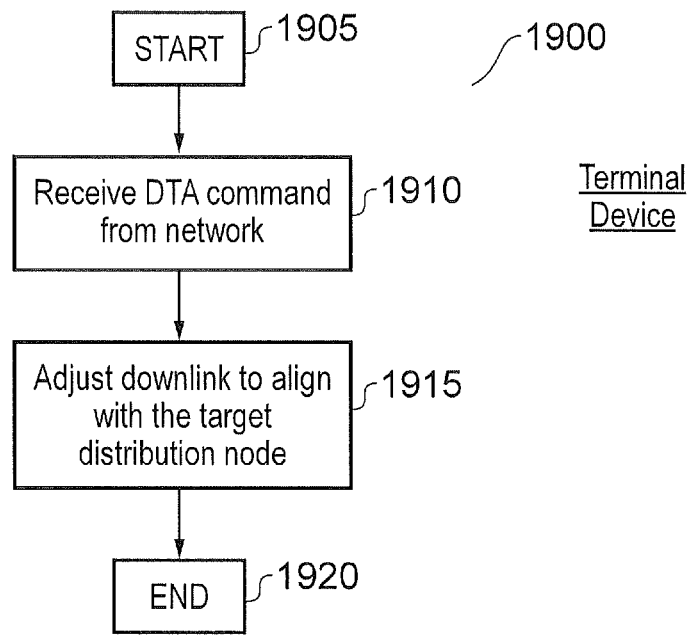
FIG. 13 shows a flow chart explaining the DTA process of a terminal device according to embodiments.

FIG. 13 shows a flowchart describing the process 1900 performed by the terminal device according to embodiments. The process 1900 starts are step 1905. The Downlink Timing Adjustment command is received from the network in step 1910. The downlink timing is adjusted in the terminal device 100 to align with the target distributed node in step 1915. The process ends at step 1920.

Figure 14:
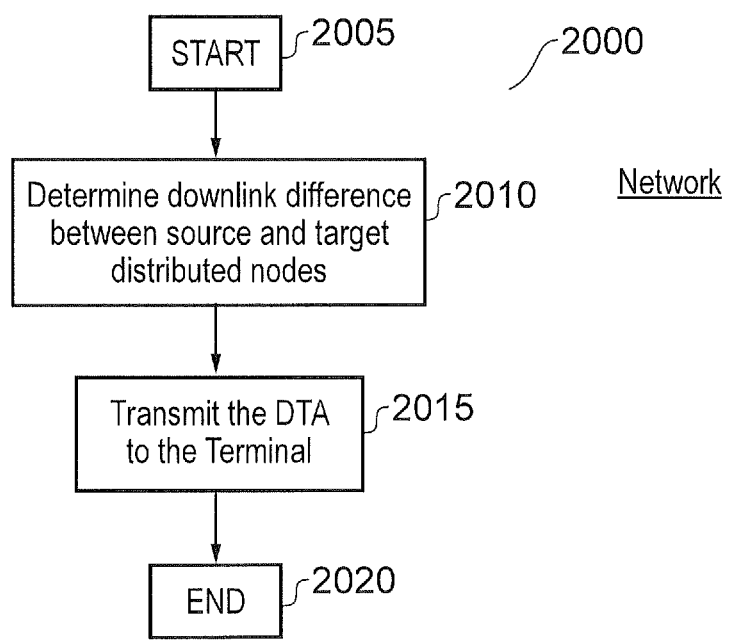
FIG. 14 shows a flow chart explaining the DTA process in the network according to embodiments.

FIG. 14 shows a flowchart describing the process 2000 performed by the network according to embodiments. In embodiments, this will be performed by the distributed node, although the disclosure is not so limited. The process 2000 starts at step 2005. The downlink time difference between the source and target distributed node is determined. This is used to derive the DTA as explained in FIG. 12 for example. This is performed in step 2010. The DTA is transmitted to the terminal device in step 2015 and the process ends in step 2020.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective Features of the Present Disclosure are Defined by the Following Numbered Paragraphs:

1. A terminal device comprising telecommunications transceiver circuitry configured to transmit data to and receive data from a communication node in a telecommunications network and controller circuitry configured to control the transceiver circuitry, the controller circuitry being configured to:
    determine the speed of movement of the terminal device; and
    control the transceiver circuitry to transmit an uplink reference signal that allows the communication node to determine the channel quality between the communication node and the terminal device, wherein the rate of transmission of the uplink reference signal is determined by the speed of movement of the terminal device.

2. A terminal device according to paragraph 1, wherein the rate of transmission of the uplink reference signal is proportional to the speed of movement.

3. A terminal device according to paragraph 1 or 2, wherein the rate of transmission of the uplink reference signal is further determined by the downlink channel quality.

4. A terminal device according to paragraph 3, wherein the rate of transmission of the uplink reference signal is increased when the downlink channel quality changes.

5. A terminal device according to paragraph 4, wherein the rate of transmission of the uplink reference signal is increased when the downlink channel quality either increases or decreases.

6. A terminal device according to paragraph 1 to 5, wherein the control circuitry is configured to determine a maximum or a minimum rate of transmission of the uplink reference signal.

7. A terminal device according to paragraph 1 to 6, wherein the control circuitry is configured to transmit the uplink reference signal using predetermined time resources, whereby when transmitting the uplink reference signal below the maximum rate, the control circuitry is configured to not transmit the uplink reference signal during one or more of the allocated resources.

8. A terminal device according to paragraph 7, wherein the transceiver circuitry is configured to receive the predetermined time resources from the communication node.

9. A terminal device according to paragraph 1 to 8, wherein the rate of transmission of the uplink reference signal is quantised in steps of speed.

10. A terminal device according to paragraph 1 to 9, wherein the control circuitry is configured to measure the uplink interference and to control the transceiver circuitry to reduce the transmission power of the uplink reference signal based on the measured uplink interference.

11. A method of operating a terminal device which comprises telecommunications transceiver circuitry configured to transmit data to and receive data from a communication node in a telecommunications network and controller circuitry configured to control the transceiver circuitry, the method comprising:
determining the speed of movement of the terminal device; and
transmitting an uplink reference signal that allows the communication node to determine the channel quality between the communication node and the terminal device, wherein the rate of transmission of the uplink reference signal is determined by the speed of movement of the terminal device.

12. A method according to paragraph 11, wherein the rate of transmission of the uplink reference signal is proportional to the speed of movement.

13. A method according to paragraph 11 to 12, wherein the rate of transmission of the uplink reference signal is further determined by the downlink channel quality.

14. A method according to paragraph 13, wherein the rate of transmission of the uplink reference signal is increased when the downlink channel quality changes.

15. A method according to paragraph 14, wherein the rate of transmission of the uplink reference signal is increased when the downlink channel quality either increases or decreases.

16. A method according to paragraph 11 to 15, comprising determining a maximum or a minimum rate of transmission of the uplink reference signal.

17. A method according to paragraph 11 to 16, comprising transmitting the uplink reference signal using predetermined time resources, whereby when transmitting the uplink reference signal below the maximum rate, the method comprises prohibiting transmission of the uplink reference signal during one or more of the allocated resources.

18. A method according to paragraph 17, comprising receiving the predetermined time resources from the communication node.

19. A method according to paragraph 11 to 18, wherein the rate of transmission of the uplink reference signal is quantised in steps of speed.

20. A method according to paragraph 11 to 19, comprising measuring the uplink interference and reducing the transmission power of the uplink reference signal based on the measured uplink interference.

21. A telecommunications network comprising a terminal device according to paragraph 1 to 10 in communication with a communications node.

22. Circuitry comprising transceiver module circuitry configured to transmit data to and receive data from a communication node in a telecommunications network and controller module circuitry configured to control the transceiver module circuitry, the controller module circuitry being configured to:
determine the speed of movement of the circuitry; and
control the transceiver circuitry to transmit an uplink reference signal that allows the communication node to determine the channel quality between the communication node and the terminal device, wherein the rate of transmission of the uplink reference signal is determined by the speed of movement of the circuitry.

23. A telecommunications network comprising a) a source base station comprising first wireless transceiver circuitry configured to transmit data to and receive data from a terminal device and first processor circuitry configured to control the first wireless transceiver circuitry and b) a target base station comprising second wireless transceiver circuitry configured to receive data from the terminal device and second processor circuitry configured to control the second wireless transceiver circuitry, the source base station and the target base station communicating over a link; wherein the first wireless transceiver circuitry and the second wireless transceiver circuitry is configured to receive a signal from a terminal device, and the first processor circuitry being configured to control the first wireless transceiver circuitry to transmit an adjustment signal to the terminal device in the event that the adjustment time is greater than a predetermined period, wherein the adjustment signal is determined based on the difference in time between the receipt of the signal at the source base station and at the target base station.

24. A telecommunications network according to paragraph 23, wherein the first processor circuitry is configured to receive, from the target base station over the link, the time of receipt of the signal from the terminal device and to calculate the adjustment signal based on difference between the time provided over the link and the time of receipt at the first wireless transceiver circuitry.

25. A telecommunication network according to paragraph 23 or 24, wherein the predetermined period is the time of the Cyclic Prefix of a modulated symbol.

26. A telecommunications network according to paragraph 23 to 25 wherein the adjustment signal comprises a system frame number.

27. A telecommunications network comprising a) a terminal device comprising first wireless transceiver circuitry configured to transmit data to and receive data from a target base station over to which the terminal device will be handed by the network and first processor circuitry configured to control the first wireless transceiver circuitry and b) the target base station comprising second wireless transceiver circuitry configured to transmit data to and receive data from the terminal device and second processor circuitry configured to control the second wireless transceiver circuitry; wherein, in response to an instruction from a source base station with which the terminal device communicates, the second processing circuitry is configured to control the second wireless transceiver circuitry to transmit a reference signal providing the downlink timing of the target base station to the terminal device; and the first wireless transceiver circuitry is configured to receive the reference signal; and the first processor circuitry is configured to adjust the downlink timing based on the received reference signal.

28. A telecommunications network according to paragraph 27, further comprising a source base station, wherein the first wireless transceiver circuitry is configured to inform the source base station that the terminal device will be handed over to the target base station.

29. A telecommunications network comprising a) a source base station comprising first wireless transceiver circuitry configured to transmit data to and receive data from a terminal device and first processor circuitry configured to control the first wireless transceiver circuitry and b) a target base station comprising second wireless transceiver circuitry configured to receive data from and send data to the terminal device and second processor circuitry configured to control the second wireless transceiver circuitry, the source base station and the target base station communicating over a link; wherein the first processor circuitry is configured to communicate to the target base station over the link, timing information relating to the downlink transmission between the terminal device and the source base station and in response to this, the second control circuitry is configured to adjust its downlink transmission with the terminal device.

30. A telecommunications network according to paragraph 29, wherein the second processor circuitry is configured to control the second wireless transceiver circuitry to send an adjustment signal to the terminal device after the downlink transmission is adjusted.

31. A method of operating a telecommunications network, the network comprising a) a source base station comprising first wireless transceiver circuitry configured to transmit data to and receive data from a terminal device and first processor circuitry configured to control the first wireless transceiver circuitry and b) a target base station comprising second wireless transceiver circuitry configured to receive data from the terminal device and second processor circuitry configured to control the second wireless transceiver circuitry, the source base station and the target base station communicating over a link; and the method comprises receiving a signal from a terminal device at the source base station and the target base station, transmitting, by the source base station, an adjustment signal to the terminal device in the event that the adjustment time is greater than a predetermined period, wherein the adjustment signal is determined based on the difference in time between the receipt of the signal at the source base station and at the target base station.

32. A method according to paragraph 31, comprising receiving at the source base station, from the target base station over the link, the time of receipt of the signal from the terminal device and calculating the adjustment signal based on difference between the time provided over the link and the time of receipt at the source base station.

33. A method according to paragraph 31 or 32, wherein the predetermined period is the time of the Cyclic Prefix of a modulated symbol.

34. A method according to paragraph 31 to 33 wherein the adjustment signal comprises a system frame number.

35. A method of operating a telecommunications network, the network comprising a) a terminal device comprising first wireless transceiver circuitry configured to transmit data to and receive data from a target base station over to which the terminal device will be handed by the network and first processor circuitry configured to control the first wireless transceiver circuitry and b) the target base station comprising second wireless transceiver circuitry configured to transmit data to and receive data from the terminal device and second processor circuitry configured to control the second wireless transceiver circuitry; the method comprising at the target base station, transmitting a reference signal providing the downlink timing of the target base station to the terminal device in response to an instruction from a source base station with which the terminal device communicates; and at the terminal device the method comprises receiving the reference signal; and adjusting the downlink timing based on the received reference signal.

36. A method according to paragraph 35, further comprising at the terminal device informing the source base station that the terminal device will be handed over to the target base station.

37. A method of operating a telecommunications network, the network comprising a) a source base station comprising first wireless transceiver circuitry configured to transmit data to and receive data from a terminal device and first processor circuitry configured to control the first wireless transceiver circuitry and b) a target base station comprising second wireless transceiver circuitry configured to receive data from and send data to the terminal device and second processor circuitry configured to control the second wireless transceiver circuitry, the source base station and the target base station communicating over a link; the method at the source base station comprising communicating to the target base station over the link, timing information relating to the downlink transmission between the terminal device and the source base station and in response to this, at the target base station, adjusting its downlink transmission with the terminal device.

38. A method according to paragraph 37, comprising at the target base station, sending an adjustment signal to the terminal device after the downlink transmission is adjusted.

39. A computer program product comprising computer readable instructions, which, when loaded onto a computer, configure the computer to perform the method of paragraph 31 to 38.

REFERENCES

[1] RP-160671, "New SID Proposal: Study on New Radio Access Technology," NTT DOCOMO, RAN #71
[2] R2-163939, "Mobility Using Uplink Measurements," Sony, RAN2#94
[3] R1-162164, "Considerations on the New Radio Operation for Ultra Dense Networks," Huawei, HiSilicon, RAN1#84bis
[4] Holma H. and Toskala A, "LTE for UMTS OFDMA and SC-FDMA based radio access", John Wiley and Sons, 2009

The invention claimed is:

1. Circuitry comprising transceiver circuitry configured to transmit data to and receive data from a communication node in a telecommunications network and control circuitry configured to control the transceiver circuitry, the control circuitry configured to:
determine the speed of movement of a terminal device; and
control the transceiver circuitry to transmit an uplink reference signal that allows the communication node to determine a channel quality between the communication node and the terminal device, wherein a rate of transmission of the uplink reference signal is proportional to the speed of movement of the terminal device.

2. The circuitry of claim 1, wherein the rate of transmission of the uplink reference signal is further determined by a downlink channel quality.

3. The circuitry of claim 2, wherein the rate of transmission of the uplink reference signal is increased when the downlink channel quality changes.

4. The circuitry of claim 3, wherein the rate of transmission of the uplink reference signal is increased when the downlink channel quality either increases or decreases.

5. The circuitry of claim 1, wherein the control circuitry is configured to determine a maximum or a minimum rate of transmission of the uplink reference signal.

6. The circuitry of claim 1, wherein the control circuitry is configured to transmit the uplink reference signal using predetermined time resources, whereby when transmitting the uplink reference signal below the maximum rate, the control circuitry is configured to not transmit the uplink reference signal during one or more of the allocated resources.

7. The circuitry of claim 6, wherein the transceiver circuitry is configured to receive the predetermined time resources from the communication node.

8. The circuitry of claim 1, wherein the rate of transmission of the uplink reference signal is quantized in steps of speed.

9. The circuitry of claim 1, wherein the control circuitry is configured to measure the uplink interference and to control the transceiver circuitry to reduce the transmission power of the uplink reference signal based on the measured uplink interference.

10. Circuitry comprising telecommunications transceiver circuitry configured to transmit data to and receive data from a communication node in a telecommunications network and control circuitry configured to control the transceiver circuitry, the control circuitry configured to:
  determine the speed of movement of a terminal device; and
  control the transceiver circuitry to transmit an uplink reference signal that allows the communication node to determine a channel quality between the communication node and the terminal device, wherein the rate of transmission of the uplink reference signal is determined by the speed of movement of the terminal device and a downlink channel quality.

11. The circuitry of claim 10, wherein the rate of transmission of the uplink reference signal is increased when the downlink channel quality changes.

12. The circuitry of claim 11, wherein the rate of transmission of the uplink reference signal is increased when the downlink channel quality either increases or decreases.

13. The circuitry of claim 10, wherein the controller circuitry is configured to determine a maximum or a minimum rate of transmission of the uplink reference signal.

14. The circuitry of claim 10, wherein the control circuitry is configured to transmit comprising transmitting the uplink reference signal using predetermined time resources, whereby when transmitting the uplink reference signal below the maximum rate, the control circuitry is configured to prohibit transmission of the uplink reference signal during one or more of the allocated resources.

15. The circuitry of claim 14, wherein the transceiver circuitry is configured to receive the predetermined time resources from the communication node.

16. The circuitry of claim 10, wherein the rate of transmission of the uplink reference signal is quantized in steps of speed.

17. Circuitry comprising transceiver circuitry configured to transmit data to and receive data from a communication node in a telecommunications network and control circuitry configured to control the transceiver circuitry, the control circuitry configured to:
  determine the speed of movement of a terminal device; and
  control the transceiver circuitry to transmit an uplink reference signal that allows the communication node to determine a channel quality between the communication node and the terminal device, wherein a rate of transmission of the uplink reference signal is determined by the speed of movement of the terminal device, and the control circuitry is configured to transmit the uplink reference signal using predetermined time resources, whereby when transmitting the uplink reference signal below a maximum rate, the control circuitry is configured to not transmit the uplink reference signal during one or more of the allocated resources.

* * * * *